Nov. 18, 1969     E. H. ARNAUDIN, JR., ET AL     3,479,446
STRAND SHIELDED CABLE AND METHOD OF MAKING
Filed June 27, 1968

INVENTORS
E. H. ARNAUDIN
R. M. WADE
BY
*U. F. Volk*

THEIR AGENT

United States Patent Office 3,479,446
Patented Nov. 18, 1969

3,479,446
STRAND SHIELDED CABLE AND METHOD OF MAKING
Edwin H. Arnaudin, Jr., Marion, and Robert M. Wade, Wabash, Ind., assignors to Anaconda Wire and Cable Company, a corporation of Delaware
Filed June 27, 1968, Ser. No. 740,536
Int. Cl. H01b 7/02, 7/34
U.S. Cl. 174—120                                    7 Claims

ABSTRACT OF THE DISCLOSURE

In a cable the strand-shield is thoroughly vulcanized on the outside but has the degree of vulcanization decreasing inwardly. The cable is formed by extending a semiconductive layer without a vulcanizing agent, extruding a layer of insulation with a vulcanizing agent heating to diffuse the vulcanizing agent into a semiconductive layer and then heating to vulcanize.

Background of the invention

This invention relates to the field of cable manufacture and particularly to the manufacture of cables for use at voltages so high that semiconducting strand shielding is applied over stranded conductors. It has been known to extrude such strand shielding, and when the insulation has been vulcanized, such as vulcanized polyethylene, it has been known to be advantageous to also have a vulcanized strand shielding so that a good bond forms between the strand shielding and the insulation. As a practical matter however, the application of vulcanized strand shielding has been objectionable for several reasons. In order to obtain a good bond between the strand shielding and the insulation it is essential that the shielding should not be fully cured before the insulation is applied. This has limited the temperatures at which strand shielding can be extruded and, consequently, the fineness of the wall that can be extruded free from gaps or pinholes. It is advantageous in at least one respect to have a plastic strand shielding rather than a rubbery or thermoset one in contact with the surface and interstices of the conductor strand, in that a plastic shielding can conform freely to the configuration assumed by the conductor when the cable is eventually installed. This advantage is lost in cable with conventionally vulcanized strand shieldings. In addition there is a considerable scrap loss of conventional shielding composition that vulcanizes in the extruder during process interruptions and at the end of each run.

Summary

We have discovered that the aforementioned shortcomings of conventional cable making can be overcome by extruding the strand shielding from a composition that is free from vulcanizing agents or from some agent essential to vulcanization but is capable of being vulcanized by an agent that migrates or diffuses into the strand shielding from the insulation. Thus our method of making an electric cable comprises the steps of continuously extruding a thin layer of semiconducting strand shielding, that is substantially free from an agent that is essential for its vulcanization, over a stranded conductor. Advantageously this composition will comprise an olefinic polymer such as polyethylene; ethylenepropylene copolymer; ethylene-propylene-(diene monomer) terpolymer; and blends thereof that are vulcanizable with organic peroxides such as dicumylperoxide. We then extrude a wall of insulating composition that comprises a dispersion of the vulcanizing agent over the strand shielding and heat the cable so as to diffuse the agent into the shielding. Following this the cable is further heated to vulcanize the shielding composition and the insulation.

Employing the above method we have invented a cable comprising a stranded conductor and a thin layer of semiconducting strand shielding directly surrounding the conductor. The strand shielding is vulcanized at its outermost surface with a degree of vulcanization decreasing radially inwardly. A thick layer of vulcanized insulating composition directly surrounds the strand shielding layer and is firmly bonded to it.

By means of our invention we propose to eliminate scrap losses due to vulcanization of semiconducting composition that is not applied to the cable.

We further propose to obtain a thinner wall of strand shielding than was formerly commercially feasible with a vulcanized composition.

We further propose to form a strand shielding that has plastic deformability on the inside surface but will bond firmly to the insulation and retain a cylindrical configuration on the outer surface.

We further propose to reduce the cost of semiconducting strand-shielding composition by eliminating a compounding operation.

Description of the preferred embodiment

Figure 2:
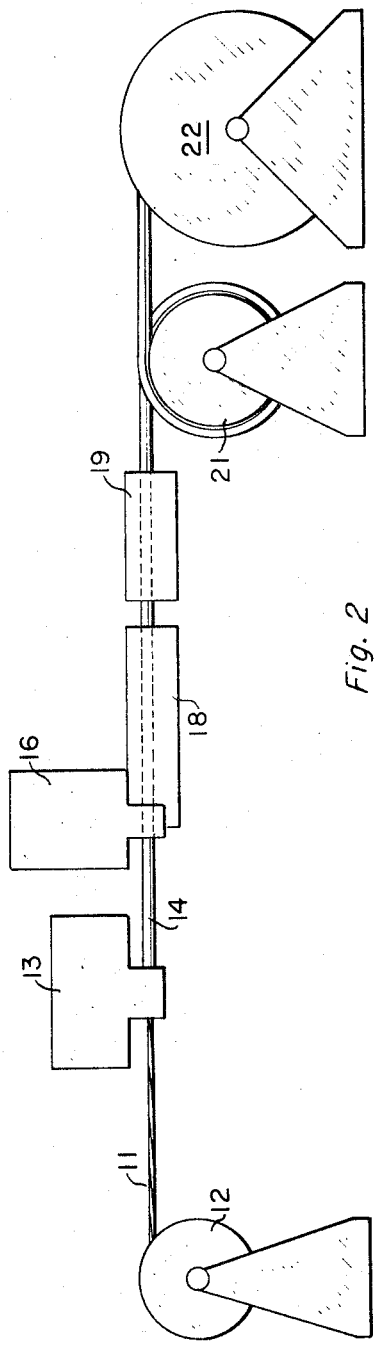
FIGURE 2 shows a side-view of the steps in the method of our invention.

Referring to FIGURE 2 a stranded conductor 11 is paying from a reel 12 into the head of an extruder 13 where it is coated with a thin layer 14 of semiconducting thermoplastic strand shielding that is, however, capable of becoming thermosetting upon the addition of a suitable vulcanizing agent. A composition which we prefer to use for the strand shielding 11 comprises 31 parts of conducting carbon black such as Vulcan XC72, available from Godfrey L. Cabot, Inc., 77 Franklin St., Boston, Mass., and 69 parts of ethylene-propylene-(diene monomer) terpolymer such as EPDM available from E. I. du Pont de Nemours & Co. Inc., wherein the diene monomer comprises 1-4 hexadiene. Other polymers, copolymers, terpolymers, and higher order polymers which are included within the expression "olefinic polymer" as used in this application comprise, for example, dicyclopentadiene, butene, and alkylidenenorbornenes. The thickness of the layer 14 is about 5 mils or less and its purpose is essentially to coat the inside surface of the insulation wall with a semiconducting layer that will eliminate areas of electrical stress between the conductor and the insulation wall which might be sources of ionization. The limiting factor, actually, for the thickness of the shielding layer 11 resides in the extrusion operation itself which is incapable of extruding an unbroken wall over a large diameter strand where the extruded composition has very high viscosity. In prior art processes the viscosity was necessarily high due to a temperature limitation if vulcanization of the stock in the extruder head was to be avoided. In our method of extruding a composition free from vulcanizing agents, temperatures of 430° F. and higher can be maintained at the extrusion die, and the reduced viscosity of the extrudate at this high temperature allows us to reduce the wall thickness without danger of pin holes. Any reduction of the diameter of a cable core under the insulation is important commercially since it reduces the expenditure for insulation and jacketing and reduces the size of the cable overall, which, in turn lessens the duct area required and the shipping weight.

Figure 1:
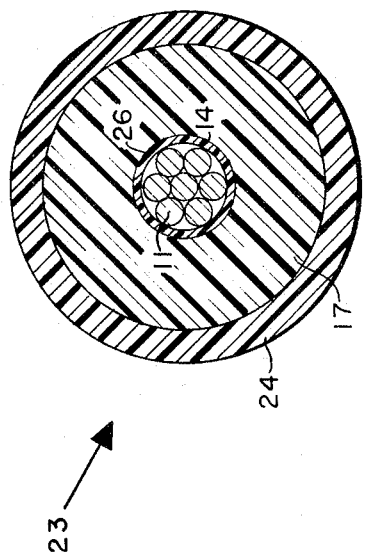
FIGURE 1 shows a section of a cable made to our invention.

The strand 11 passes from the extruder 13 directly into a second extruder 16 where it is covered with a layer of insulation 17 (FIGURE 1). Although we have shown the extruders 13 and 16 to be separate our method can also be applied with extruders, of which several types are known, which apply concentric layers in a single head. When the hot extruded composition 17 comes in contact with the underlying layer 14 of semiconducting composition the vulcanizing agent in the insulation starts to diffuse into the layer 14. In the preferred embodiment this agent comprises dicumylperoxide which is present in a concentration of approximately 2% in the composition 17 the remainder of which is substantially all low-density polyethylene. The wall 17 may however comprise other olefinic polymers such as the copolymer of ethylene and propylene and ethylene-propylene-(diene monomer) terpolymers or blends thereof, all of which are included within the term "olefinic polymers" as used in this application, within the scope of our invention. The limiting consideration is that a vulcanizing agent in the insulation should be capable of diffusing into the strand shielding during the extrusion and curing of the former and of bonding an appreciable depth of the strand shielding onto the inner surface of the insulation. This depth of full vulcanization should be at least one mil.

The vulcanizing agent need not diffuse through the entire thickness of the layer 14, however. Indeed it is an advantage to have the degree of vulcanization taper off radially inwardly so that the inside of the layer remains thermoplastic and deformable. This not only enables the strand shielding to adjust to changes in the configuration of the strand on flexing but provides a sealing effect for any cracking that may ultimately occur in the vulcanized outer surface due to overheating during the life of the cable.

Although we prefer to use dicumylperoxide for our vulcanizing agent it will be understood that other organic peroxides, such, for example, as peroxides having hydrocarbon radicals containing a tertiary carbon atom attached to each oxygen atom of the peroxide linkage disclosed in Patent 3,079,370, may be used within the scope of our invention.

Upon leaving the extruder 16 the strand 11 covered by layers 14 and 17 passes into a chamber 18 where it is heated to activate the vulcanizing agents. The heat applied in the chamber 18 plus the sensitive heat carried into the extruder 16 from the extruder 13 not only causes the vulcanizing agent to cross-link the olefinic molecules and thus effect vulcanization but also to diffuse from layer 17 into layer 14 for an appreciable distance. Chambers suitable for vulcanizing the layer 17 with pressurized steam are well known and are called continuous vulcanizers in the cable making industry.

Upon leaving the chamber 18 the cable passes in a known manner through a cooling unit 19 which may also be pressurized and is thence taken-up by a capstan 21 whence it is accumulated on a reel 22. From the reel 22 the cable may be jacketed in a known manner in a separate operation or a jacket may be applied by another extruder (not shown) upstream of the capstan 21 in the manner disclosed in application Ser. No. 692,893 filed Dec. 22, 1967, and assigned to the assignee of the present invention.

The resulting cable, which is indicated generally by the numeral 23 in FIGURE 1 after the application of a semiconducting jacket 24, is characterized by the fact that an outer surface 26 of the semiconducting strand-shielding layer 14 is thoroughly vulcanized and bonded to the layer 17. This fully vulcanized shielding extends inwardly for a depth of at least one mill but thereafter the degree of vulcanization is attenuated until, at the surface of the conductor 11, the shielding is substantially thermoplastic.

We have invented a new and useful electric cable and method of which the foregoing description has been exemplary rather than definitive and for which we desire an award of Letters Patent as defined in the following claims.

We claim:
1. The method of making an electric cable comprising the steps of:
   (A) continuously extruding a thin layer of semiconducting polymeric strand shielding over a stranded conductor, said layer being substantially free from an agent essential for the vulcanization thereof,
   (B) continuously and directly extruding a wall of insulating composition over said strand shielding:
      (a) said composition comprising a vulcanizing agent uniformly dispersed therein,
      (b) said agent being capable of vulcanizing said composition and said shielding,
   (C) heating said cable so as to diffuse said agent from said composition into said shielding, and
   (D) further heating said cable,
      (a) thereby vulcanizing said composition and said shielding,
      (b) and bonding said shielding to said wall of insulating composition.

2. The method of claim 1 wherein said shielding and said insulating composition each comprises an olefinic polymer and said agent comprises an organic peroxide.

3. The method of claim 2 wherein said peroxide comprises dicumylperoxide.

4. An electric cable comprising:
   (A) a stranded conductor,
   (B) a thin layer of semiconducting polymeric strand shielding directly surrounding said conductor,
      (a) said layer being vulcanized at its outermost surface and
      (b) decreasing radially inwardly in degree of vulcanization,
   (C) a thick layer of vulcanized insulating composition directly surrounding and firmly bonded to said strand shielding layer.

5. The cable of claim 4 wherein said shielding and insulating layers each comprises an olefinic polymer.

6. The cable of claim 4 wherein said shielding layer and said insulating layer are vulcanized with an organic peroxide.

7. The cable of claim 6 wherein said peroxide comprises dicumylperoxide.

References Cited

UNITED STATES PATENTS 3,096,210   7/1963   Boonstra.

E. A. GOLDBERG, Primary Examiner

U.S. Cl. X.R.

117—218; 156—51, 308; 264—174, 248